Dec. 22, 1953     A. C. CURTIS     2,663,326
END CLOSURE FOR PUP JOINTS USED IN COATING
THE INTERIOR OF PIPE LINES
Filed Jan. 22, 1953     2 Sheets-Sheet 1
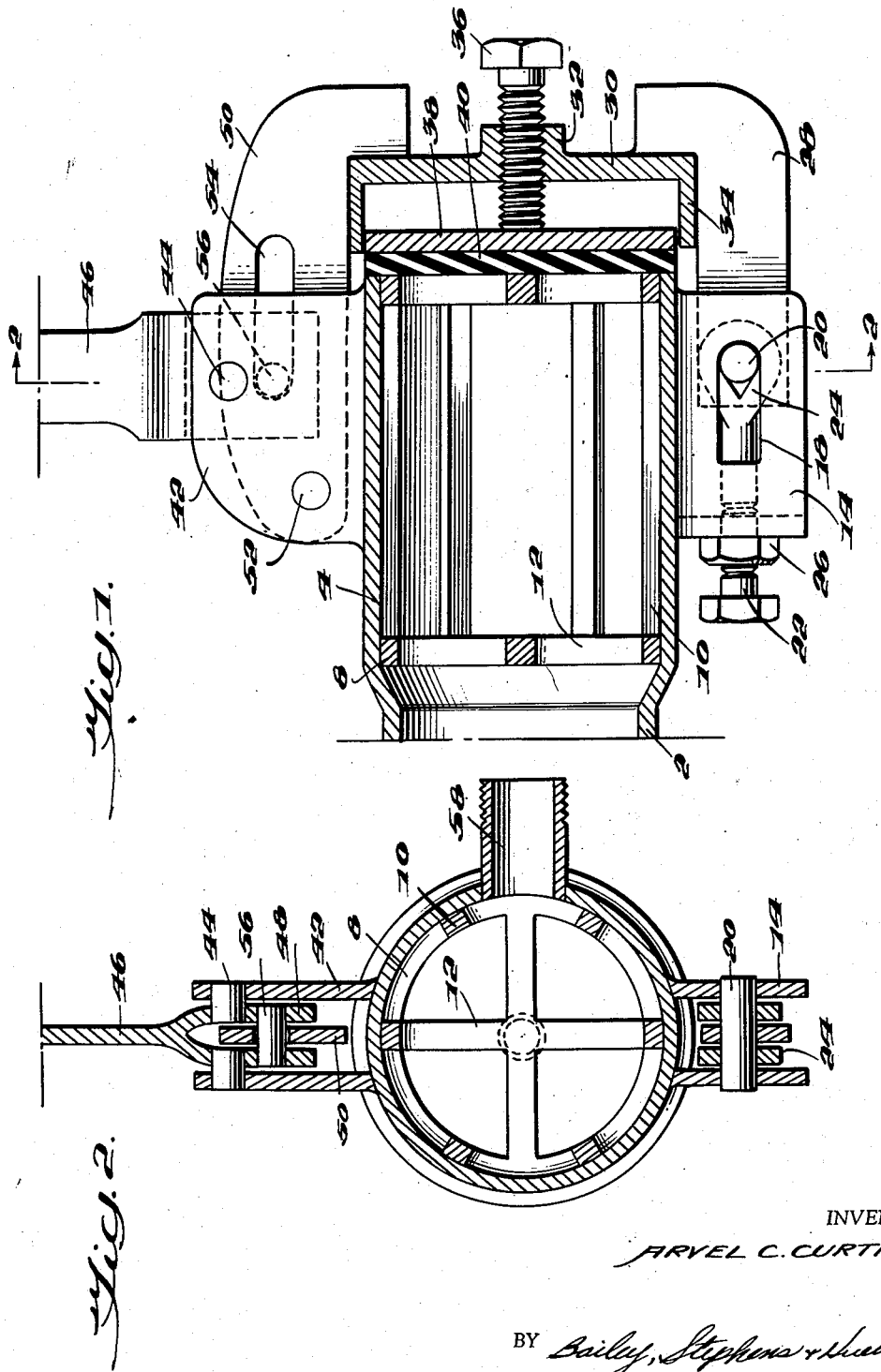
INVENTOR
ARVEL C. CURTIS,
BY *Bailey, Stephens & Huettig*
ATTORNEYS Dec. 22, 1953     A. C. CURTIS     2,663,326
END CLOSURE FOR PUP JOINTS USED IN COATING
THE INTERIOR OF PIPE LINES
Filed Jan. 22, 1953     2 Sheets-Sheet 2
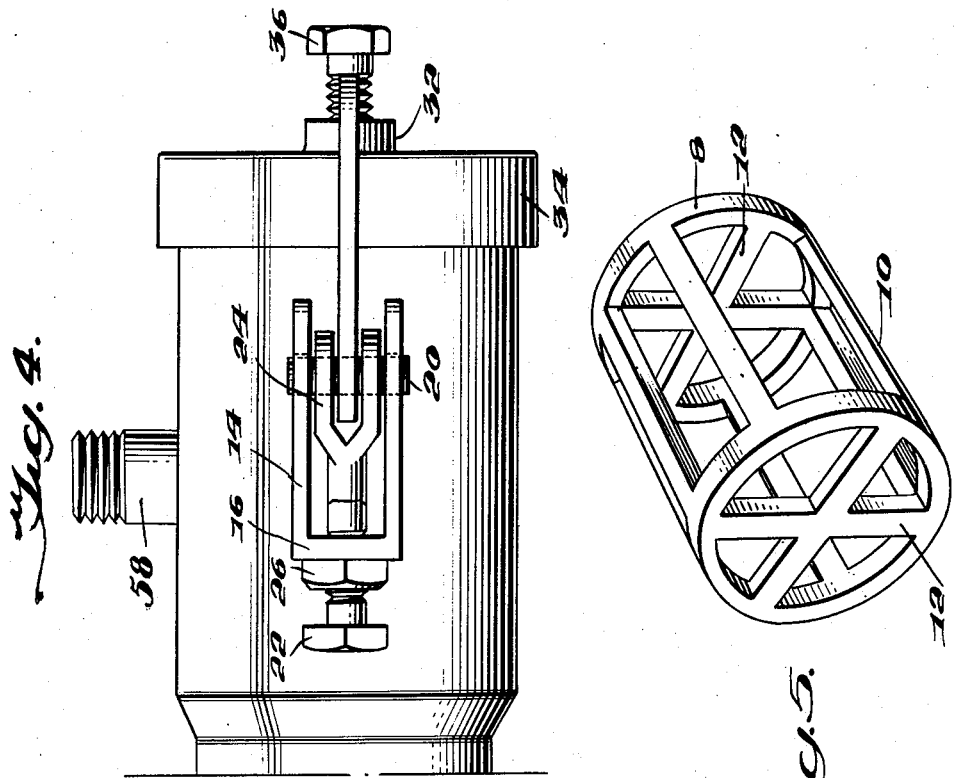
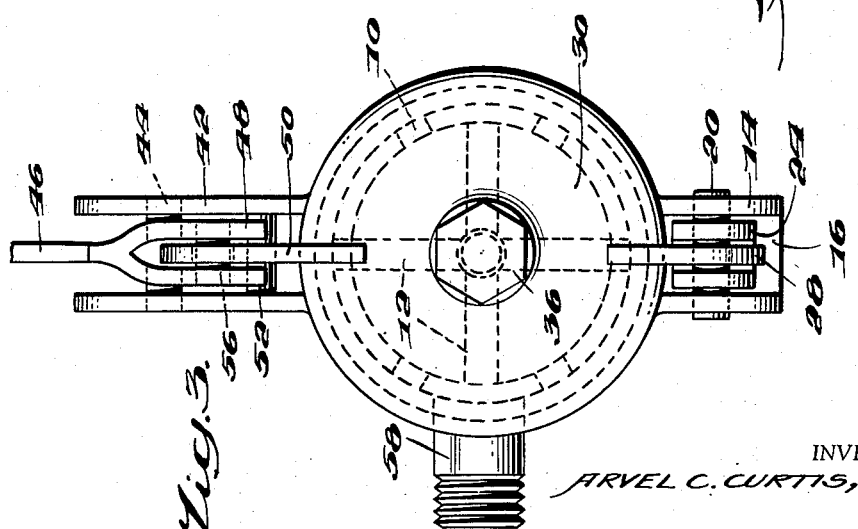
INVENTOR
ARVEL C. CURTIS,
BY
ATTORNEYS

UNITED STATES PATENT OFFICE 2,663,326

END CLOSURE FOR PUP JOINTS USED IN COATING THE INTERIOR OF PIPE LINES

Arvel C. Curtis, Odessa, Tex., assignor to Pipelife, Inc., a corporation of Texas Application January 22, 1953, Serial No. 332,741

3 Claims. (Cl. 138—89)

The invention relates to a closure for the end of pup joints used in treating, and especially in painting, the interior of pipe lines.

The Curtis and Tomlinson patent, No. 2,480,358, discloses a pipe line painting system in which a body of paint enclosed between two rubber plugs is passed through a pipe line by air pressure to coat the inside wall of the line. In that system, there are pup joints connected to each end of the line to be painted. However, the plugs are put into these pup joints before the joints are attached to the line, and the ends of the pup joints are permanently closed.

The primary object of the present invention is to provide an end closure for pup joints intended for use in such a system which improves the efficiency and ease of operation of the system.

Another object of the invention is to provide an end closure for pup joints which can be opened almost instantaneously and which leaves the end of the joint entirely unobstructed.

A further object of the invention is to provide an end closure which ensures a proper seal at all times so that leakage is effectively prevented. Since proper painting technique requires maintenance of a carefully controlled back pressure resisting movement of the plugs in the line, leakage in the receiving pup joint might disturb the proper pressure relationship and cause imperfections in the job.

Still another object of the invention is to provide a pup joint end closure which is of simple and inexpensive construction and which is nevertheless durable and easy to operate.

An additional object of the invention is to provide an end closure which can be readily opened from the side of the pup joint, so that the user is not endangered by the release of the plugs from the joint under pressure.

Still a further object of the invention is to arrange the release mechanism of such a closure so as to minimize danger to the operator in opening the pup joint.

Further objects and advantages of the invention will appear more fully from the following description, especially when taken in conjunction with the accompanying drawings which form a part thereof.

In the drawings:

Fig. 1 shows in vertical cross-section an end closure embodying my invention;

Fig. 2 is a cross-section on the line 2—2 of Fig. 1;

Fig. 3 is an end view;

Fig. 4 is a bottom plan view; and

Fig. 5 is a perspective view of the bumper basket.

The end closure is applied to a pup joint having a main portion the cross-section of which, as indicated by part 2, is the same as that of the pipe to be coated. One of these is secured to each end of the pipe section in any suitable manner, for example as shown in the patent referred to above. The end portion 4 of the pup joint is of somewhat larger diameter. Within this enlarged end portion fits a bumper basket in the form of a cage composed of end rings 8, longitudinal ribs 10 and cross bars 12 within the rings 8. The purpose of this basket, as explained more fully in my application for Method of Coating the Interior of Pipe Lines, executed of even date herewith Serial No. 332,739, is to space the plugs inward from the outer end of the pup joint so as to allow air pressure to be introduced behind the plugs.

Welded on the bottom of section 4 is a bracket of U-shaped cross-section forming parallel vertical walls 14 connected by cross piece 16, and provided with slots 18. Within these slots is slidable a pivot pin 20. A bolt 22 having a forked end forming eyes 24 is threaded in a nut 26 welded on part 16, so that, by turning the bolt, the position of the pivot pin 20 can be changed. Bolt 22 is formed of two parts, one turnable with respect to the other, to allow this adjustment.

Pivoted on pin 20 is a flat angle piece 28. Welded in the angle of this piece is the main closure member composed of a wall 30 having a central enlargement 32 and a flange 34 of an internal diameter equal to the external diameter of pup joint part 4.

A screw bolt 36 threaded in enlargement 32 engages one face of a plate 38 which fits inside flange 34 and has on its other face a sealing layer 40 of rubber or other suitable material which engages the edge of the open end of part 4.

Welded on top of part 4 are parallel plates 42. Between these is pivoted, by stub pivots 44, a lever 46 having a forked lower end 48. This straddles a hook 50 pivoted on pin 52 and arranged to catch the upper part of the main closure member. Hook 50 has a slot 54 in which is arranged a pin 56 carried by the forked part 48 of lever 46.

A pipe 58 leads into the side of part 4.

This pup joint is used in the manner described more in detail in the application referred to above.

In loading the line, the lever 46 is swung to the left (Fig. 1), pin 56 then moving counterclockwise and raising hook 50. This allows closure 30 to drop down about pivot 20, and opens the end of the pup joint. The painting plugs are introduced into the joint through its open end, and the bumper basket is inserted into part 4 behind the rear plug.

Closure 30 is now raised until it can be engaged by hook 50, which is restored to position by moving lever 46 to the right. Screw 36 is then turned as much as is necessary to seat sealing disc 40 sufficiently to prevent air leakage. Paint is introduced between the plugs. Air under pressure is then introduced through pipe 58 to propel the plugs and the paint between them through the line.

During this operation, the closure of the pup joint at the other end is kept closed, with a bumper basket in position in the pup joint. When the run is completed, and any excess paint has been removed, the front plug rests against the bumper basket of the receiving pup joint with the trailing plug close behind it. These plugs are pushed forward by air pressure from the rear.

Now the operator strikes a sharp blow on the upper end of handle 46, towards the left in Fig. 1. This raises hook 50 and closure 30 is released and is thrown down immediately by the pressure of the plugs through the bumper basket. The end of the pup joint is then fully opened, and the bumper basket and plugs are shot out of the joint under the pressure of the air in the pipe line.

The fact that the lever is moved towards the pipe line, or away from the open end of the pup joint, in releasing hook 50 ensures that the operator in exerting sufficient force to open the end closure will, if he should stumble, fall away from the open end and not into the path of the released plugs which might cause serious injury.

While I have described herein one embodiment of my invention, I wish it to be understood that I do not intend to limit myself thereby except within the scope of the claims hereto or hereinafter appended.

I claim:

1. A closure for a pup joint having an open end comprising a bracket mounted on the outside of the joint at the bottom thereof, a pivot carried by said bracket, an angle member mounted on said pivot and having a part extending upward partly across the open end, a main closure member including a body portion secured to said upwardly extending part and a flange directed towards the open end of the pup joint, the inside diameter of the flange being equal to the outside diameter of such open end, a sealing plate within the flange engaging such open end, a bolt threaded in the body portion of the main closure member engaging such plate, a second bracket mounted on the outside of the pup joint at the top thereof, a hook pivoted in said bracket and adapted to engage over said main closure member when the same is in closed position, a lever pivoted in said bracket about a different axis from the axis of the hook, the pivots of both the lever and the hook lying inwardly of the open end of the pipe, and pin and socket means connecting the lever and hook whereby turning of the lever moves the hook between latching and releasing positions.

2. A closure for a pup joint having an open end comprising a bracket mounted on the outside of the joint at the bottom thereof, a pivot carried by said bracket, an angle member mounted on said pivot and having a part extending upward partly across the open end, a main closure member including a body portion secured to said upwardly extending part and a flange directed towards the open end of the pup joint, the inside diameter of the flange being equal to the outside diameter of such open end, a sealing plate within the flange engaging such open end, a bolt threaded in the body portion of the main closure member engaging such plate, a second bracket mounted on the outside of the pup joint at the top thereof, a hook pivoted in said bracket and adapted to engage over said main closure member when the same is in closed position, a lever pivoted in said bracket about a different axis from the axis of the hook, the pivots of both the lever and the hook lying inwardly of the open end of the pipe, and pin and slot means connecting the lever and hook whereby turning of the lever away from the open end moves the hook to releasing position.

3. A closure for a pup joint having an open end comprising a bracket mounted on the outside of the joint at the bottom thereof, a pivot carried by said bracket, an angle member mounted on said pivot and having a part extending upward partly across the open end, a main closure member including a body portion secured to said upwardly extending part and a flange directed towards the open end of the pup joint, the inside diameter of the flange being equal to the outside diameter of such open end, a sealing plate within the flange engaging such open end, a bolt threaded in the body portion of the main closure member engaging such plate, a second bracket mounted on the outside of the pup joint at the top thereof, a hook pivoted in said bracket and adapted to engage over said main closure member when the same is in closed position, a lever pivoted in said bracket at a point higher and closer to the open end than the pivot of the hook, the pivots of both the lever and the hook lying inwardly of the open end of the pipe, said hook having a slot therein, and a pin carried by the lever below its pivot engaging in said slot, whereby movement of the end of the lever above its pivot away from the open end raises the hook to release the closure member.

ARVEL C. CURTIS.

References Cited in the file of this patent

UNITED STATES PATENTS

| Number | Name | Date |
|---|---|---|
| 667,333 | Pflugh | Feb. 5, 1901 |
| 882,626 | Fisk | Aug. 6, 1907 |
| 1,208,041 | Steere | Dec. 12, 1916 |
| 1,559,949 | Feldmeier | Nov. 3, 1925 |

FOREIGN PATENTS

| Number | Country | Date |
|---|---|---|
| 679,366 | France | Jan. 9, 1930 |